US011870157B2

(12) United States Patent
Lei et al.

(10) Patent No.: US 11,870,157 B2
(45) Date of Patent: Jan. 9, 2024

(54) PHASE SHIFTER AND REMOTE ELECTRICAL TILT ANTENNA

(71) Applicant: HUAWEI TECHNOLOGIES CO., LTD., Guangdong (CN)

(72) Inventors: Fuwei Lei, Xi'an (CN); Xinming Liu, Xi'an (CN); Maobin Li, Dongguan (CN); Weimin Li, Xi'an (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 494 days.

(21) Appl. No.: 17/161,550

(22) Filed: Jan. 28, 2021

(65) Prior Publication Data

US 2021/0151881 A1 May 20, 2021

Related U.S. Application Data

(63) Continuation of application No. PCT/CN2019/098116, filed on Jul. 29, 2019.

(30) Foreign Application Priority Data

Jul. 31, 2018 (CN) ........................ 201810860216.3

(51) Int. Cl.
*H01P 1/18* (2006.01)
*H01Q 3/36* (2006.01)
*H01Q 3/40* (2006.01)

(52) U.S. Cl.
CPC ............... *H01Q 3/36* (2013.01); *H01P 1/184* (2013.01); *H01Q 3/40* (2013.01)

(58) Field of Classification Search
CPC ............ H01Q 3/36; H01Q 3/40; H01Q 1/246; H01Q 3/32; H01P 1/184
See application file for complete search history.

(56) References Cited

U.S. PATENT DOCUMENTS

| | | | | |
|---|---|---|---|---|
| 2009/0278761 | A1 | 11/2009 | Kinen et al. | |
| 2017/0288306 | A1* | 10/2017 | Sledkov | H01P 1/184 |

FOREIGN PATENT DOCUMENTS

| | | | |
|---|---|---|---|
| CN | 201369380 | Y | 12/2009 |
| CN | 102570033 | A | 7/2012 |
| CN | 203787537 | U | 8/2014 |
| CN | 205452488 | U | 8/2016 |
| CN | 105990633 | A | 10/2016 |
| CN | 106921011 | A | 7/2017 |
| CN | 206789668 | U | 12/2017 |
| CN | 108232377 | A | 6/2018 |
| JP | 2017188750 | A | 10/2017 |

(Continued)

*Primary Examiner* — David E Lotter
(74) *Attorney, Agent, or Firm* — WOMBLE BOND DICKINSON (US) LLP

(57) ABSTRACT

This application relates to a phase shifter and a remote electrical tilt antenna including the foregoing phase shifter. The metal strip includes a cavity, a metal strip, a sliding dielectric, and a fastener, where the fastener fastens the metal strip in the cavity, so that a transmission portion of the metal strip is suspended in the cavity, requiring no metal strip to be disposed on a substrate, thereby reducing the signal energy loss of the substrate, decreasing the heat generated due to the signal energy loss, and lowering the requirements of the phase shifter on heat dissipation and temperature resistance of an internal mechanical part.

20 Claims, 3 Drawing Sheets

(56) References Cited

FOREIGN PATENT DOCUMENTS

| | | | |
|---|---|---|---|
| SE | 528903 | C2 | 3/2007 |
| WO | 2006130083 | A1 | 12/2006 |
| WO | 2018120618 | A1 | 7/2018 |

* cited by examiner

PHASE SHIFTER AND REMOTE ELECTRICAL TILT ANTENNA

CROSS-REFERENCE TO RELATED APPLICATIONS

This application is a continuation of International Application No. PCT/CN2019/098116, filed on Jul. 29, 2019, which claims priority to Chinese Patent Application No. 201810860216.3, filed on Jul. 31, 2018. The disclosures of the aforementioned applications are hereby incorporated by reference in their entireties.

TECHNICAL FIELD

This application relates to the field of communications technologies, and in particular, to a phase shifter and a remote electrical tilt antenna.

BACKGROUND

In a wireless communications system, a remote electrical tilt antenna is one of the key devices for network coverage. Continuous adjustment of a downtilt angle of a vertical beam in the remote electrical tilt antenna is achieved by a key component, namely, a phase shifter of the remote electrical tilt antenna, so that network coverage is more flexible. Specifically, a principle of the remote electrical tilt antenna is changing a phase of a signal that flows through the phase shifter and feeds into a radiating element, and further altering a downtilt angle of a vertical beam formed by an antenna. Therefore, how a phase shifter performs directly affects performance of a remote electrical tilt antenna, and in particular, affects a loss of a phase shifter module, thereby directly affecting a gain of a remote electrical tilt antenna, heat dissipation of an internal structure of the phase shifter, temperature-resistance reliability of an internal structure of the phase shifter, and the like. Therefore, needs for a low-loss phase shifter have gone mainstream.

SUMMARY

This application provides a low-loss phase shifter and a remote electrical tilt antenna.

The phase shifter includes a cavity, a metal strip, a sliding dielectric, a fastener, a signal input terminal, and a signal output terminal, where the metal strip is electrically connected to the signal input terminal and the signal output terminal, and the metal strip includes a transmission portion and a fastening portion connected to the transmission portion; the fastener is connected to the fastening portion to fasten the metal strip in the cavity and the transmission portion is suspended in the cavity; and the sliding dielectric is disposed in the cavity and movable relative to the transmission portion of the metal strip. The sliding dielectric is movable relative to the transmission portion, so that power and a phase of a signal output by the signal output terminal is altered.

In an embodiment, the sliding dielectric is movable relative to the metal strip, to change an area of the metal strip covered by the sliding dielectric on a transmission section between the signal input terminal and the signal output terminal. Therefore, an equivalent dielectric constant of the sliding dielectric on the transmission section between the signal input terminal and the signal output terminal is changed, thereby altering power and a phase of a signal output by the signal output terminal. In this application, the metal strip has a structure formed by a metal wire, and the metal strip is fastened by the fastener in the cavity, so that the transmission portion of the metal strip is suspended in the cavity, requiring no metal strip to be disposed on a substrate, thereby reducing the signal energy loss of the substrate, decreasing the heat generated due to the signal energy loss, and lowering the requirements of the phase shifter on heat dissipation and temperature resistance of an internal mechanical part.

In an embodiment of this application, the fastener includes a first fastener, the metal strip includes a first surface and a second surface opposite to the first surface, and the first fastener includes a first part disposed on the first surface and a second part disposed on the second surface; and both ends that are of the first portion and the second part and that are far away from the metal strip abut against an inner wall of the cavity, thereby locating the metal strip in the cavity.

In an embodiment, the metal strip is suspended by the first fastener in the cavity, and the metal strip is limited to move in the cavity in a direction perpendicular to the metal strip, so that a signal transmitted on the metal strip can be effectively transmitted in the cavity.

The cavity includes a first inner wall and a second inner wall that are opposite to each other, the first inner wall faces toward to the first surface of the metal strip, and the second inner wall faces toward to the second surface of the metal strip. A first groove is provided on the first inner wall, an end that is of the first part and that is far away from the metal strip is accommodated in the first groove, and/or a second groove is provided on the second inner wall, and an end that is of the second part and that is far away from the metal strip is accommodated in the second groove. The first fastener fits with the first groove and/or the second groove, so that the position one side or two sides of the first fastener is limited, and the position of the first fastener is limited by the first groove and/or the second groove, thereby locating the metal strip in the cavity. Specifically, the metal strip is limited to move in the cavity in a direction that is parallel to a plane of the metal strip and that is perpendicular to an extension direction (e.g., a longitudinal direction) of the metal strip.

It may be understood that, in another embodiment of this application, the first groove may alternatively be provided at an end that is of the first part of the first fastener and that is far away from the metal strip, and the second groove may be provided at an end that is of the second part of the first fastener and that is far away from the metal strip. A first protrusion is disposed on the first inner wall, a second protrusion is disposed on the second inner wall, the first protrusion is accommodated in the first groove, and the second protrusion is accommodated in the second groove, thereby locating the metal strip in the cavity.

The first part and the second part of the first fastener may be integrated; or the first part and the second part of the first fastener are two separate parts, and the first part and the second part are fixedly connected, so that the metal strip is clamped between the first part and the second part. It may be understood that there may be one or more first fasteners in an extension direction of the metal strip.

In an embodiment, the signal input terminal and the signal output terminal are distributed on a same side of the metal strip, and the signal input terminal and the signal output terminal are spaced away from each other in an extension direction of the metal strip; and the fastener includes a first fastener, the first fastener is fastened to the metal strip, and the signal input terminal and the signal output terminal are located on a same side of the metal strip.

The first fastener is disposed on one side that is of the metal strip is disposed and on which the signal input terminal and the signal output terminal are disposed, so that the first fastener can exert a relatively good supporting effect on one end that is of the metal strip and at which the signal input terminal and the signal output terminal are disposed, thereby avoiding an instability problem of the metal strip resulted from a relatively strong force exerted to one side that is of the metal strip and that is connected to the signal input terminal and the signal output terminal.

In another embodiment of this application, the signal input terminal and the signal output terminal may be disposed on two sides of the metal strip, and the first fastener is disposed on both sides of the metal strip to ensure the stability of the metal strip.

In another embodiment of this application, the fastener includes a second fastener, and the second fastener is located on the same side as the first fastener and is spaced away from the first fastener; and the second fastener includes a first part disposed on the first surface of the metal strip and a second part disposed on the second surface, and both ends that are of the first part and the second part and that are far away from the metal strip abut against an inner wall of the cavity, so that the metal strip is located in the cavity.

In this embodiment, the second fastener is further disposed on the metal strip, so that an end that is of the second fastener and that is far away from the metal strip abuts against the inner wall of the cavity, thereby locating the metal strip in the cavity in a direction perpendicular to the metal strip, and preventing the metal strip from moving in the cavity in a direction perpendicular to the metal strip. The second fastener is located on the same side as the first fastener and is spaced away from the first fastener, so that the first fastener and the second fastener can support each position of the metal strip at multiple points, thereby further stabilizing the metal strip in the cavity.

The second fastener is provided with an opening, and the opening runs through the first part and the second part. A side wall of the cavity is provided with a through hole corresponding to the opening. A limiting component passes through the through hole and the opening, so that the metal strip is fastened in the cavity, preventing the metal strip from moving in any direction in the cavity, and limiting a position of the metal strip in the cavity, thereby ensuring the quality of the phase shifter.

The first part and the second part of the second fastener may be integrated; or the first part and the second part of the second fastener are two separate parts, and the first part and the second part are fixedly connected, so that the metal strip is clamped between the first part and the second part.

In an embodiment of this application, the sliding dielectric is flat, and the sliding dielectric is located on one side of a first plane or a second plane of the metal strip, or one sliding dielectric is located on one side of the first plane and one sliding dielectric is located on one side of the second plane. In this application, according to practical requirements, the sliding dielectric may be disposed on one side or two opposite sides of the metal strip, so that phases are changed differently based on requirements when the sliding dielectric is moved by a same distance. Specifically, compared with the case that the sliding dielectric is disposed on one side of the first surface or that of the second surface, when the sliding dielectric is disposed on both the first surface and the second surface, the sliding dielectric is moved by a same distance, and a dielectric constant of a dielectric changes greatly in the transmission section within the moved distance. That is, a phase changes greatly. Moreover, the sliding dielectric located on any surface of the metal strip may be a whole structure, or may be formed by splicing a plurality of divided structures.

Further, in some embodiments of this application, two sliding dielectrics are fastened together, so that the two sliding dielectrics are synchronously movable, thereby facilitating the operation.

In an embodiment of this application, the sliding dielectric and the metal strip each include a first section, a second section, and a connection section that connects the first section and the second section. The first section is staggered with the second section in a direction perpendicular to an extension direction of the metal strip; the first section of the sliding dielectric is stacked on the first section of the metal strip and movable relative to the first section of the sliding dielectric, and the second section of the sliding dielectric is stacked on the second section of the metal strip and movable relative to the second section of the sliding dielectric. There are two or more second fasteners. In the direction perpendicular to the extension direction of the metal strip, one of the second fasteners and the first section of the sliding dielectric are located on a same side of the second section of the sliding dielectric, and the second fastener is disposed in a sliding direction of the first section of the sliding dielectric, to limit the stroke of the sliding dielectric relative to the metal strip.

In the direction perpendicular to the extension direction of the metal strip, another second fastener and the second section of the sliding dielectric are located on a same side of the first section of the sliding dielectric, and the second fastener is disposed in a sliding direction of the second section of the sliding dielectric, to limit the stroke of the sliding dielectric relative to the metal strip.

According to the phase shifter in an embodiment, when the sliding dielectric is moved relative to the metal strip, a moving distance of the sliding dielectric relative to the metal strip is limited by the second fastener, so that the sliding dielectric is prevented from being detached from a surface of the metal strip, and a problem that a phase cannot be adjusted is also avoided. That is, at least a partial overlap of the metal strip and the sliding dielectric in a direction perpendicular to the metal strip is ensured, and a coverage area of the sliding dielectric on the metal strip is changed, to change a phase of an output signal.

In another embodiment of this application, the sliding dielectric is provided with one or more conduits disposed at intervals, the second fastener is inserted into the conduit and movable along the conduit, and an extension direction of the conduit is the same as that of the metal strip. The sliding medium is provided with the conduit, so that the second fastener exerts no impact on the sliding dielectric. The conduit fits with the second fastener to limit the stroke of the sliding dielectric relative to the metal strip, and preventing the sliding dielectric from being detached from the metal strip.

In an embodiment of this application, the transmission portion of the metal strip includes a wavy structure formed by a bent metal wire. The wavy section is disposed on the metal strip, to shorten a length of the phase shifter as much as possible when a length of the metal wire forming the metal strip is determined. Therefore, as the fine phase shift control is achieved, a volume of the phase shifter can be reduced as much as possible, thereby facilitating integration of the phase shifter with another structure.

In an embodiment of this application, wherein the metal strip includes a plurality of sub-metal strips, and each sub-metal strip is connected via radio frequency.

In an embodiment of this application, the phase shifter further includes a sliding dielectric driving piece, which is connected to the sliding dielectric, to drive the sliding dielectric to move relative to the metal strip. The remote electrical tilt antenna includes a radiating element and the foregoing phase shifter. The radiating element is connected to an output port of the phase shifter via radio frequency, to change, by using the phase shifter, a phase of a signal fed into the radiating element. In this application, a signal transmitted in the phase shifter has a relatively low energy loss, so that a signal fed into the radiating element through the phase shifter has relatively strong energy, thereby increasing a gain of the remote electrical tilt antenna. Furthermore, less heat is generated due to an energy loss of a transmitted signal in the phase shifter, so that the temperature resistance reliability of each structure in the phase shifter of the remote electrical tilt antenna is enhanced.

There may be one or more radiating elements, and a plurality of radiating elements are connected to a signal output port of the phase shifter via radio frequency. Moreover, there may be one or more independent phase shifters in the remote electrical tilt antenna, to meet practical requirements for users.

BRIEF DESCRIPTION OF DRAWINGS

The structural features and functions of this application are further clearly elaborated as follows with reference to the in-detail figures and specific embodiments.

DESCRIPTION OF EMBODIMENTS

Technical solutions in embodiments of this application are described clearly and in complete with reference to the accompanying drawings in the embodiments of this application.

Figure 1:
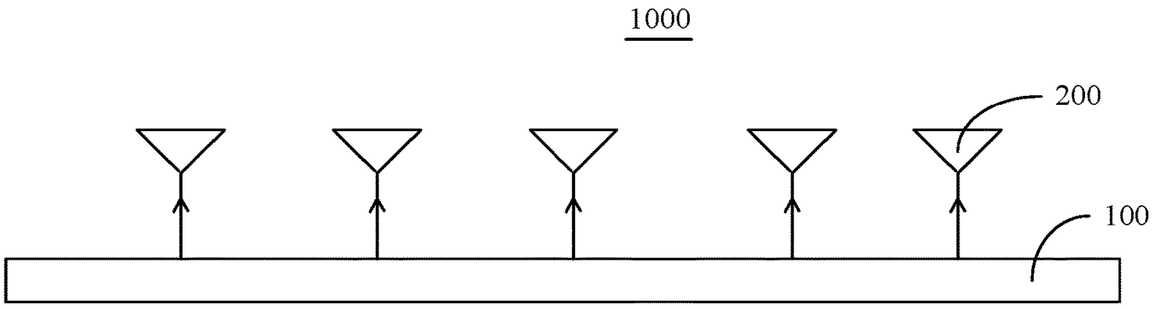
FIG. 1 is a schematic structural diagram of a remote electrical tilt antenna according to this application.

Referring to FIG. 1, this application provides a remote electrical tilt antenna 1000. The remote electrical tilt antenna 1000 includes a phase shifter 100 and a radiating element 200 connected to the phase shifter 100. A signal that needs to be radiated by the radiating element 200 is changed to a required phase by the phase shifter 100, and then is radiated by the radiating element 200. The radio frequency connection includes an electrical connection, a coupling connection, or the like. There may be one or more radiating elements 200, and a plurality of radiating elements 200 are connected to signal output ports of the phase shifters 100 via radio frequency. In this embodiment, the phase shifter 100 is in a long-strip shape. There are five radiating elements 200, and the five radiating elements 200 are spaced away along a length direction of the phase shifter 100. In this embodiment, the radiating element 200 is a radiating antenna. Further, there may be one or more independent phase shifters 100 in the remote electrical tilt antenna 1000, to meet practical requirements for users.

Figure 2:
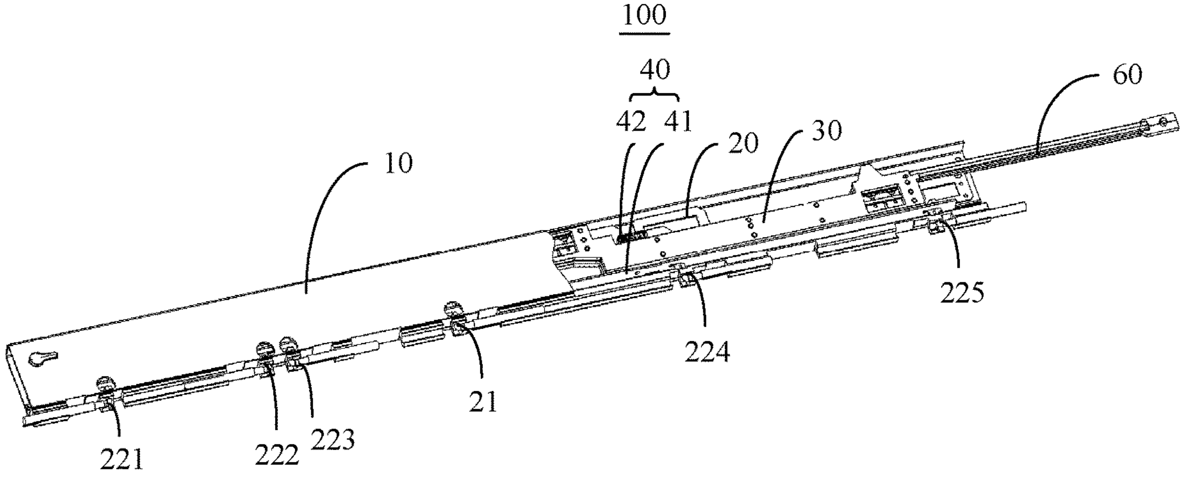
FIG. 2 is a schematic structural diagram of a phase shifter according to this application.
Figure 3:
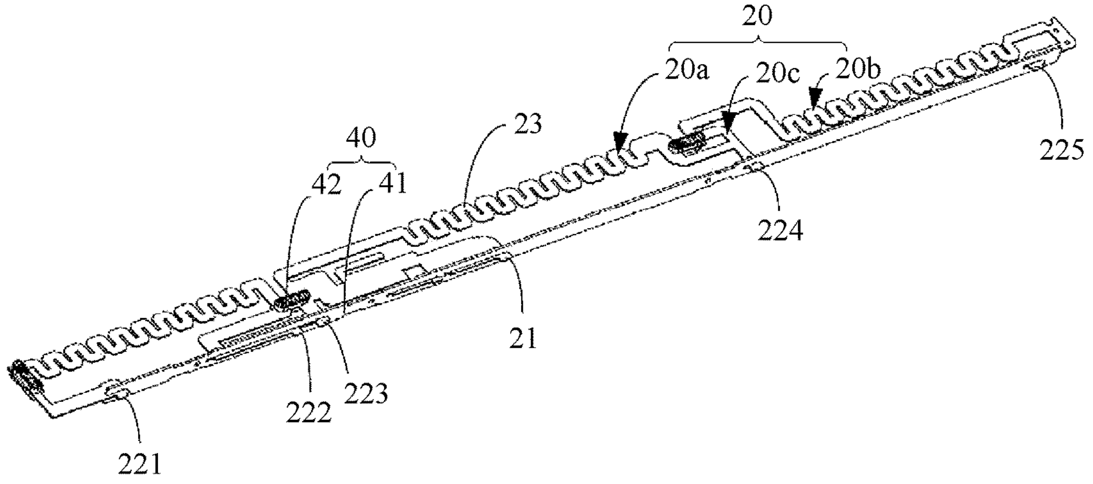
FIG. 3 is a schematic structural diagram of a metal strip and a fastener of a phase shifter according to this application.

Referring to FIG. 2 and FIG. 3, the phase shifter 100 includes a cavity 10, a metal strip 20, a sliding dielectric 30, and a fastener 40. The phase shifter 100 further includes a signal input terminal 21 and one or more signal output terminals 22 disposed at intervals. The signal input terminal 21 and the signal output terminal 22 are disposed at different positions in an extension direction of the metal strip 20 and are electrically connected to the metal strip 20. The metal strip 20, the sliding dielectric 30, the signal input terminal 21, and the signal output terminal 22 are all accommodated in the cavity 10. The metal strip 20 includes a fastening portion and a transmission portion connected to the fastening portion. The fastener 40 is connected to the fastening portion of the metal strip 20 and fastens the metal strip 20 in the cavity 10, and the transmission portion of the metal strip 20 is suspended in the cavity 10, thereby stably locating the metal strip 20 in the cavity 10 and ensuring quality of the phase shifter 100. In this embodiment, an area, on which the fastener 40 is disposed, on the metal strip 20 is the fastening portion, and another part of the metal strip 20 except the fastening portion is the transmission portion. The sliding dielectric 30 is disposed on a surface of the metal strip 20 and movable relative to the metal strip 20, to change an area of the metal strip 20 covered by the sliding dielectric 30 on the transmission section between the signal input terminal 21 and the signal output terminal 22, so that an equivalent dielectric constant of the sliding dielectric in the transmission section between the signal input terminal 21 and the signal output terminal 22 is changed, thereby altering power and a phase of a signal output by the signal output terminal 22. "The transmission section between the signal input terminal 21 and the signal output terminal 22" is a signal transmission path for transmitting a signal from the signal input terminal 21 to the signal output terminal 22.

In an embodiment, a signal that needs to be radiated is transmitted by the signal input terminal 21 to the cavity 10, and is transmitted by dielectrics in the cavity 10 to the signal output terminal 22 along a direction of the metal strip 20. The dielectrics in the cavity 10 include the sliding dielectric 30 stacked on a surface of the metal strip 20 and air around the metal strip 20. When the sliding dielectric 30 is moved along the metal strip 20, an equivalent dielectric constant of a dielectric in a transmission section between the signal input terminal 21 and the signal output terminal 22 is changed, thereby altering a phase of the signal transmitted from the signal output terminal 22. For example, before the sliding dielectric 30 is moved, only air between the metal strip 20 and the cavity 10 exists in the dielectric in the transmission section. After the sliding dielectric 30 is moved by a specific distance into the transmission section, both the sliding dielectric 30 and the air between the metal strip 20 and the cavity 10 become the dielectrics in the transmission section, thereby altering an equivalent dielectric constant of the dielectrics in the transmission section and a phase of a signal output by the signal output terminal 22. Furthermore, when the sliding dielectric 30 is moved continuously, an area of the sliding dielectric 30 in the transmission section continuously changes, thereby altering an equivalent dielectric constant of the dielectrics in the transmission section and continuously altering a phase of a signal output by the signal output terminal 22. Therefore, in this application, the sliding dielectric 30 can be moved by a specific distance based on practical needs, so that a radiated signal has a required phase.

In an embodiment, the phase shifter has one signal input terminal 21 and five signal output terminals 22, and the signal input terminal 21 and the signal output terminals 22 are located on a same side of the metal strip 20. The signal input terminal 21 is located in a middle area of the metal strip 20, and the five signal output terminals 22 are separately disposed on two sides of the signal input terminal 21. Moreover, each signal output terminal 22 has a different distance to the signal input terminal 21, so that a signal output by each the signal output terminal 22 has a different phase. Specifically, the five signal output terminals 22 are sequentially arranged along an extension of the metal strip 20, namely, a first signal output terminal 221, a second signal output terminal 222, a third signal output terminal 223, a fourth signal output terminal 224, and a fifth signal output terminal 225. The first signal output terminal 221, the second signal output terminal 222, and the third signal output terminal 223 are located on one side of the signal output terminal 21, and the fourth signal output terminal 224 and the fifth signal output terminal 225 are located on the other side of the signal output terminal 21.

In an embodiment, the metal strip 20 is a strip-shaped structure formed by processed metal pieces such as metal wires or metal plates. The metal strip 20 is fastened by the fastener 40 in the cavity 10, so that the transmission portion of the metal strip 20 is suspended in the cavity, requiring no metal strip to be disposed on a substrate, thereby reducing a signal energy loss of the substrate and increasing a gain of the remote electrical tilt antenna 1000. In addition, heat generated due to the signal energy loss can be reduced, thereby lowering requirements of the phase shifter 100 on heat dissipation and temperature resistance performance of an internal structural part, and enhancing temperature resistance reliability of each structure in the remote electrical tilt antenna 1000. In this embodiment, the metal strip 20 is an integrated structure. It may be understood that, in another embodiment of this application, a plurality of sub-metal strips 20 may be included in the metal strip 20 and are connected via radio frequency to form the metal strip 20.

Furthermore, in some implementations of this application, the transmission portion of the metal strip 20 includes one or more wavy sections 23 disposed at intervals, and the wavy section 23 is a wavy structure formed by a processed metal wire or a metal plate. The wavy structure is applied on the metal strip, to shorten a length of the phase shifter 100 as much as possible when a length of the metal wire forming the metal strip 20 is determined. Therefore, as the fine phase shift control is achieved, a volume of the phase shifter 100 can be reduced as much as possible, thereby facilitating integration of the phase shifter 100 with another structure.

Figure 4:
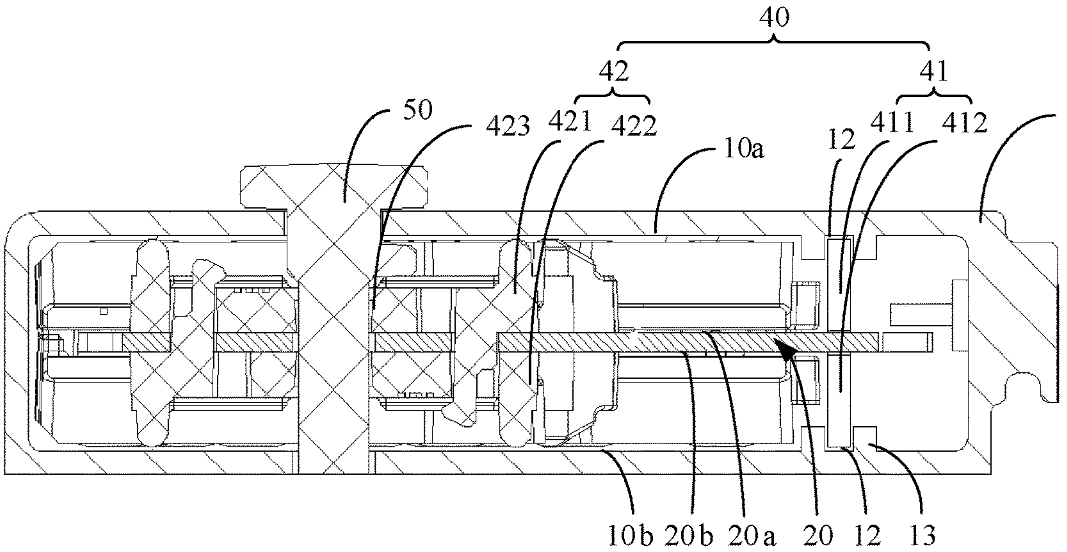
FIG. 4 is a schematic sectional diagram of the phase shifter in FIG. 2.

Referring to FIG. 2 to FIG. 4, in an embodiment of this application, the fastener 40 includes one or more first fasteners 41 disposed at intervals along an extension direction of the metal strip 20. The first fastener 41 is disposed on one side of the metal strip 20 and is perpendicular to a surface of the metal strip 20. In this embodiment, there is one first fastener 41, and the first fastener 41 is fastened to one side on which the metal strip 20 is connected to the signal input terminal 21 and the signal output terminal 22. The signal input terminal 21 and the signal output terminal 22 pass through the first fastener 21 and are connected to the radiating element 200 via electricity or transmission. The metal strip 20 includes a first surface **20*a* and a second surface 20*b* opposite to the first surface 20*a*, and the first fastener 41 includes a first part 411 disposed on the first surface 20*a* and a second part 412 disposed on the second surface 20*b*. Ends that are of the first part 411 and the second part 412 and that are far away from the metal strip 20 abut against an inner wall of the cavity 10, thereby locating the metal strip 20 in the cavity 10. The metal strip 20 is suspended by the first fastener 41 in the cavity 10, and the metal strip 20 is limited to move in the cavity 10 in a direction perpendicular to the metal strip 20, so that the signal transmitted on the metal strip 20 can be effectively transmitted in the cavity 10. Furthermore, the first fastener 41 is fastened on one side on which the metal strip 20 is connected to the signal input terminal 21 and the signal output terminal 22, so that the first fastener 41 can exert a relatively good supporting effect on one end that is of the metal strip 20 and at which the signal input terminal 21 and the signal output terminal 22 are disposed, thereby avoiding an instability problem of the metal strip 20 resulted from a relatively strong force exerted to one side that is of the metal strip 20 and that is connected to the signal input terminal 21 and the signal output terminal 22. In another embodiment of this application, the signal input terminal 21 and the signal output terminal 22 may be disposed on two sides of the metal strip 20, and the first fastener 41 may be disposed on both sides of the metal strip 20. Therefore, the first fastener 41 disposed on both sides of the metal strip 20 supports the signal input terminal 21 or the signal output terminal 22 disposed on two sides of the metal strip 20 to ensure stability of the metal strip 20**.

In an embodiment, the first fastener 41 is made of an insulation material, to avoid impacts of the first fastener 41 on signal transmission. It may be understood that, in another embodiment of the present invention, a part that is of the first fastener 41 and that is not in contact with the metal strip 20 may be made of a metal material, or a metal layer is disposed on an outer surface of the insulated first fastener 41, to exert no impact on signal transmission and achieve a good supporting effect.

The first part 411 and the second part 412 of the first fastener 41 may be integrated; or the first part 411 and the second part 412 of the first fastener 41 are two separate parts, and the first part 411 and the second part 412 are fixedly connected, so that the metal strip 20 is clamped between the first part 411 and the second part 412. Specifically, the first part 411 and the second part 412 may be fastened by welding or pasting, or in various ways easy to disassembly, such as buckling or fastening with a screw. It may be understood that there may be one or more first fasteners 41 in an extension direction of the metal strip 20.

Referring to FIG. 4, in another embodiment of this application, the fastener 40 includes one or more second fasteners 42 disposed at intervals. The second fastener 42 is located on the same side as the first fastener 41 and is spaced away from the first fastener 41. In addition, a plurality of second fasteners 42 are disposed at different positions of the metal strip 20. Therefore, the first fastener 41 and the second fastener 42 provide support to each position of the metal strip 20 at multiple points, thereby further stabilizing the metal strip 20 in the cavity 10. The second fastener 42 includes a first part 421 disposed on the first surface **20*a* of the metal strip 20 and a second part 422 disposed on the second surface 20*b*. Ends that are of the first part 421 and the second part 422 and that are far away from the metal strip 20 abut against the inner wall of the cavity 10, to limit displacement of the metal strip 20 in a direction perpendicular to a surface of the metal strip 20, in other words, to limit movement in an up-down direction shown in the figure, thereby locating the metal strip 20 in the cavity 10 and stabilizing the metal strip 20 in the cavity 10**.

The first part 421 and the second part 422 of the second fastener 42 may be integrated; or the first part 421 and the second part 422 of the second fastener 42 are two separate parts, and the first part 421 and the second part 422 are fixedly connected, so that the metal strip 20 is clamped between the first part 421 and the second part 422.

The second fastener 42 is provided with an opening 423, and the opening 423 runs through the first part 421 and the second part 422. A side wall of the cavity 10 is provided with a through hole 13 corresponding to the opening 423. A limiting component 50 passes through the through hole 13 and the opening 423, so that the metal strip 20 is fastened in the cavity 10, preventing the metal strip 10 from moving in any direction in the cavity 10, and ensuring stability of the metal strip 20 in the cavity 10, thereby ensuring quality of the phase shifter 100. The limiting component 50 may be a limiting structure such as a bolt or a screw.

In some embodiments of this application, the phase shifter 100 may include only the first fastener 41 or the second fastener 42. Each position of the metal strip 20 may be stably supported and disposed in the cavity 10 by using the first fastener 41 or the second fastener 42.

Figure 5:
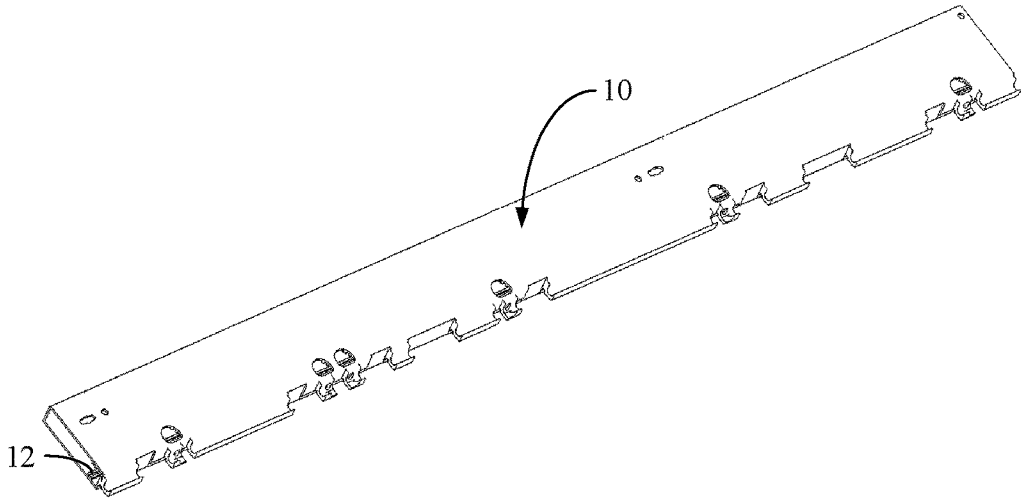
FIG. 5 is a schematic structural diagram of a cavity of a phase shifter according to this application.

Referring to FIG. 4 and FIG. 5, in this application, the cavity 10 is a long-strip-shaped tubular structure. In this embodiment, the cavity 10 is a square tube. It may be understood that, in another embodiment of this application, the cavity 10 may also be a cylindrical tube or another polygonal tube. The cavity 10 includes a first inner wall **10*a* and a second inner wall 10*b* that are opposite to each other. The first inner wall 10*a* faces toward a first surface 20*a* of the metal strip 20. The second inner wall 10*b* faces toward the second surface 20*b* of the metal strip 20. A first groove 11 is provided on the first inner wall 10*a*, a second groove 12 opposite to the first groove 11 is provided on the second inner wall 10*b*, and an opening direction of the first groove 11 is opposite to that of the second groove 12. Furthermore, the first groove 11 and the second groove 12 each have a width the same as a thickness of the first fastener 41. The first groove 11 may be obtained by depressing a surface of the first inner wall 10*a* in a direction far away from the metal strip 20. Alternatively, two convex strips 13 are disposed on a surface of the first inner wall 10*a* in a direction toward the metal strip 20 and are spaced away from each other, and a gap between the two convex strips 13 is the first groove 11. The second groove 12 may be obtained by depressing a surface of the second inner wall 10*b* in a direction far away from the metal strip 20. Alternatively, two convex strips 13 are disposed on a surface of the second inner wall 10*b* in a direction toward the metal strip 20 and are spaced away from each other, and a gap between the two convex strips 13 is the second groove 12. An end that is of the first part 411 of the first fastener 41 and that is far away from the metal strip 20 is accommodated in the first groove 11, and an end that is of the second part 412 of the first fastener 41 and that is far away from the metal strip 20 is accommodated in the second groove 12, thereby limiting movement of the metal strip 20 parallel to a plane of the metal strip 20 and perpendicular to the extension direction of the metal strip 20. In other words, movement of the metal strip 20 in a left-right direction shown in the figure is limited, thereby locating and stably disposing the metal strip 20 in the cavity 10. In this embodiment, when the phase shifter 100 is assembled, the first fastener 41 drives the metal strip 20 to slide into the cavity 10 along the first groove 11 and the second groove 12, thereby making assembling a structure of the phase shifter 100 simple. It may be understood that, in another embodiment of the present invention, only the first groove 11 is provided on the first inner wall 10*a*, or only the second groove 12 is provided on the second inner wall 10*b*, to limit one side of the first fastener 41. This manner can also locate and stably dispose the metal strip 20 in the cavity 10. Specifically, the first groove 11 and the second groove 12 coordinate with the first fastener 41 mainly to limit movement of the metal strip 20 in the cavity 10 that is parallel to the plane of the metal strip 20 and perpendicular to the extension direction of the metal strip 20, or limit movement of the metal strip 20 in a left-right direction as shown in FIG. 4**.

It may be understood that, in another embodiment of this application, the first groove may alternatively be provided at an end that is of the first part 411 of the first fastener 41 and that is far away from the metal strip 20, and the second groove may be provided at an end that is of the second part 412 of the first fastener 41 and that is far away from the metal strip 20. A first protrusion is disposed on the first inner wall **10*a*, a second protrusion is disposed on the second inner wall 10*b***, the first protrusion is accommodated in the first groove, and the second protrusion is accommodated in the second groove, thereby locating the metal strip in the cavity.

Figure 6:
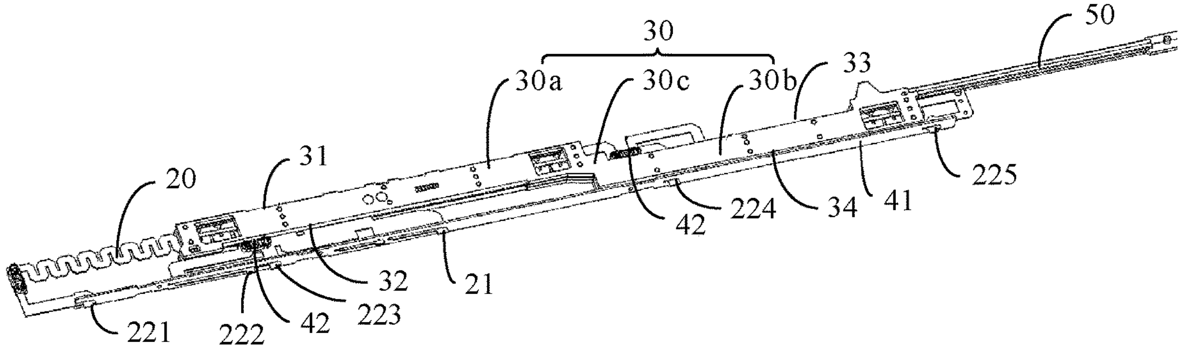
FIG. 6 is a schematic structural diagram of a metal strip and a sliding dielectric in a phase shifter according to an embodiment of this application.

Referring to FIG. 6, in an embodiment of this application, the sliding dielectric 30 is flat and is located on one side of a first surface **20*a* or a second surface 20*b* of the metal strip 20; or the sliding dielectric 30 is located on one side of the first surface 20*a* and one side of the second surface 20*b*. In this application, according to practical requirements, the sliding dielectric 30 may be disposed on one side or two opposite sides of the metal strip 20, so that phases are changed differently based on requirements when the sliding dielectric 30 is moved by a same distance. Specifically, compared with the case that the sliding dielectric 30 is disposed on one side of the first surface 20*a* or that of the second surface 20*b*, when the sliding dielectric 30 is disposed on both the first surface 20*a* and the second surface 20*b*, the sliding dielectric 30 is moved by a same distance, and a dielectric constant of a dielectric changes greatly in the transmission section within the moved distance. That is, a phase changes greatly. In this embodiment, there are two sliding dielectrics 30. The two sliding dielectrics 30 are fastened together by a buckle or a screw, so that the two sliding dielectrics 30 are synchronously movable to facilitate an operation. Moreover, the sliding dielectric 30 located on any surface of the metal strip 20** may be a whole structure, or may be formed by splicing a plurality of divided structures.

A length of the sliding dielectric 30 is less than that of the metal strip 20. When the sliding dielectric 30 is moved relative to the metal strip 20, phases of output signal terminals 22 located at two ends of the metal strip 20 are simultaneously changed. For example, when the sliding dielectric 30 is moved toward the first signal output terminal 221, an area of the sliding dielectric 30 covering the metal strip 20 in a transmission section between the signal input terminal 21 and the first signal output terminal 221 enlarges, thereby increasing an equivalent dielectric constant of the dielectric in the transmission section. In this case, in a transmission section between the signal input terminal 21 and the fifth signal output terminal 225, an area of the sliding dielectric 30 covering the metal strip 20 is reduced, thereby decreasing an equivalent dielectric constant of the dielectric in the transmission section, and simultaneously changing phases of the first signal output terminal 221 and the fifth signal output terminal 225.

Referring to FIG. 3 and FIG. 6 again, in an embodiment of this application, the sliding dielectric 30 includes a first section 30*a*, a second section 30*b*, and a connection section 30*c* connecting the first section 30*a* and the second section 30*b*. The first section 30*a* and the second section 30*b* are staggered in a direction perpendicular to the extension direction of the metal strip 20. In this embodiment, the first section 30*a*, the second section 30*b*, and the connection section 30*c* are connected to form a Z-shaped structure. The metal strip 20 includes a first section 20*a*, a second section 20*b*, and a connection section 20*c* connecting the first section 20*a* and the second section 20*b*. The first section 20*a* and the second section 20*b* are staggered in the direction perpendicular to the extension direction of the metal strip 20. In this embodiment, the first section 20*a*, the second section 20*b*, and the connection section 20*c* are connected to form a Z-shaped structure. The first section 30*a* of the sliding dielectric 30 is stacked on the first section 20*a* of the metal strip 20 and movable relative to the first section 30*a*. The second section 30*b* of the sliding dielectric 30 is stacked on the second section 20*b* of the metal strip and movable relative to the second section 30*b* of the sliding dielectric.

There are two or more second fasteners 42. In the direction perpendicular to the extension direction of the metal strip 20, one of the second fasteners 42 and the first section 30*a* of the sliding dielectric are located on a same side of the second section 30*b* of the sliding dielectric, and the second fastener 42 is disposed in a sliding direction of the first section 30*a* of the sliding dielectric, to limit the stroke of the sliding dielectric relative to the metal strip 20. In an embodiment, the second fastener 42 may be located on one side away from the second section 30*b* in a stroke direction of the first section 30*a*, or located on one side near the second section 30*b* in a stroke direction of the first section 30*a*. Likewise, another second fastener 42 and the second section 30*b* of the sliding dielectric 30 are located on a same side of the first section 30*a* of the sliding dielectric 30, and the second fastener 42 is disposed in a sliding direction of the second section 30*b* of the sliding dielectric 30, to limit the stroke of the sliding dielectric 30 relative to the metal strip 20. Specifically, the second fastener 42 may be located on one side away from the first section 30*a* in a stroke direction of the second section 30*b*, or located on one side near the first section 30*a* in a stroke direction of the second section 30*b*.

In an embodiment, the first section 30*a* of the sliding dielectric 30 includes an upper end face 31 and a lower end face 32 parallel to the upper end face 31. The second section 30*b* includes an upper end face 33 and a lower end face 34 parallel to the upper end face 33. The upper end faces of the first section 30*a* and the second section 30*b* are located on a same side of the lower end faces. In other words, when the upper end face 31 is located above the lower end face 32, the upper end face 33 is also located above the lower end face 34. One of the second fasteners 42 is disposed in the first section 20*a* of the metal strip 20, and an outer surface of the second fastener 42 is in contact with the lower end face 32 of the first section 30*a* of the sliding dielectric 30. In addition, the second fastener 42 is movable along the lower end face 32 of the first section 30*a*, and a moving interval thereof is between the connection section 30*c* and an end that is of the first section 30*a* and that is far away from the second section 30*b*. Another second fastener 42 is disposed in the second section 20*b* of the metal strip 20, and an outer surface of the second fastener 42 is in contact with the upper end face 33 of the second section 30*b* of the sliding dielectric 30. The second fastener 42 is movable along the upper end face 33 of the second section 30*b*, and a moving interval thereof is between the connection section 30*c* and an end that is of the second section 30*b* and that is far away from the first section 30*a*.

According to the phase shifter 100 in an embodiment, when the sliding dielectric 30 is moved relative to the metal strip 20, a moving distance of the sliding dielectric 30 relative to the metal strip 20 is limited by the second fastener 42, so that the sliding dielectric 30 is prevented from being detached from a surface of the metal strip 20, and a problem that a phase cannot be adjusted is also avoided. That is, at least a partial overlap of the metal strip 20 and the sliding dielectric 30 in a direction perpendicular to the metal strip 20 is ensured, and a coverage area of the sliding dielectric 30 on the metal strip 20 is changed, to change a phase of an output signal. For example, when the sliding dielectric 30 is moved toward the first signal output terminal 221 to a specific position, the second fastener 42 moved relative to the lower end face 32 of the first section 30*a* is moved to the connection section 30*c* and is blocked by the connection section 30*c*, so that the sliding dielectric 30 is prevented from becoming dispatched from the metal strip 20 due to further movement toward the first signal output terminal 221. Likewise, when the sliding dielectric 30 is moved toward the fifth signal output terminal 225 to a specific position, the second fastener 42 is moved relative to the upper end face 33 of the second section 30*b* is moved to the connection section 30*c* and is blocked by the connection section 30*c*, so that the sliding dielectric 30 is prevented from becoming dispatched from the metal strip 20 due to further movement toward the fifth signal output terminal 225.

Figure 7:
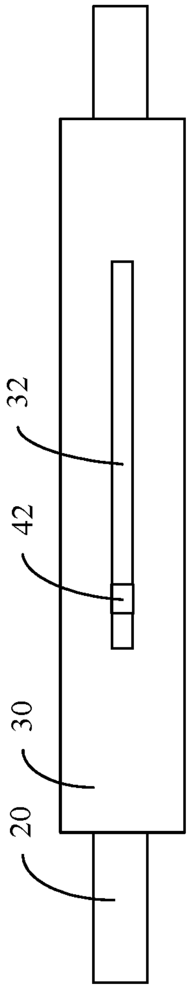
FIG. 7 is a schematic structural diagram of a metal strip and a sliding dielectric in a phase shifter according to another embodiment of this application.

Referring to FIG. 7, in another embodiment of this application, the sliding dielectric 30 is provided with one or more conduits 32 disposed at intervals, the second fastener 42 is inserted into the conduit 32 and is movable along the conduit 32, and an extension direction of the conduit 32 is the same as that of the metal strip 20. The conduit 32 is provided on the sliding dielectric 30, to avoid impacts of the second fastener 42 on sliding of the sliding dielectric 30. In addition, the conduit 32 limits a stroke of the sliding dielectric 30 relative to the metal strip 20 to ensure that the sliding dielectric 30 can partially cover the metal strip 20 through movement, and ensure that phases of signals output by different signal output terminals 22 can be changed by moving the sliding dielectric 30.

The sliding dielectric 30 may be in a tubular shape, and the sliding dielectric 30 is sleeved on the metal strip 20. The tubular sliding dielectric 30 is moved relative to the metal strip 20 to change a phase of an output signal. The tubular sliding dielectric may be a circular tube, a square tube, or a tube with a cross section of another shape.

Referring to FIG. 2 again, in an embodiment of this application, the phase shifter 100 further includes a sliding dielectric driving piece 60, which is connected to the sliding dielectric 30 to drive the sliding dielectric 30 to move relative to the metal strip 20. In this embodiment, the sliding dielectric driving piece 60 is a driving rod. One end of the driving rod is connected to the sliding dielectric 30, and the other end is connected to various driving apparatuses such as a motor or a cylinder to drive the sliding dielectric 30 to be connected.

In an embodiment, a signal transmission line of the phase shifter 100 is the metal strip 20 formed by metal pieces such as metal wires or metal plates. The metal strip 20 is fastened and suspended by the fastener 40 in the cavity 10, requiring no metal strip to be disposed on a substrate, thereby reducing a signal energy loss of the substrate, decreasing heat generated due to the signal energy loss, and lowering requirements of the phase shifter 100 on heat dissipation and temperature resistance of an internal mechanical part.

The foregoing embodiments are preferred implementations of this application. It shall be noted that a person of ordinary skill in art may further make improvements and modifications without departing from the principle of this application. These improvements and modifications shall fall within the protection scope of this application.

What is claimed is:

1. A phase shifter, comprising:
- a cavity;
- a signal input terminal;
- a signal output terminal;
- a metal strip connected to the signal input terminal and the signal output terminal, wherein the metal strip comprises a transmission portion and a fastening portion connected to the transmission portion;
- a fastener connected to the fastening portion to fasten the metal strip in the cavity, wherein the transmission portion is suspended in the cavity from the fastener being connected to the fastening portion; and
- a sliding dielectric disposed in the cavity and movable relative to the transmission portion of the metal strip.

2. The phase shifter according to claim 1, wherein the fastener comprises a first fastener, the metal strip comprises a first surface and a second surface opposite to the first surface, and the first fastener comprises a first part disposed on the first surface and a second part disposed on the second surface; and both ends that are of the first part and the second part and that are far away from the metal strip abut against an inner wall of the cavity.

3. The phase shifter according to claim 2, wherein the cavity comprises a first inner wall and a second inner wall that are opposite to each other, the first inner wall faces toward the first surface of the metal strip, and the second inner wall faces toward the second surface of the metal strip, a first groove is disposed on the first inner wall, an end that is of the first part of the first fastener and far away from the metal strip is accommodated in the first groove, and/or a second groove is disposed on the second inner wall, and an end that is of the second part of the first fastener far away from the metal strip is accommodated in the second groove.

4. The phase shifter according to claim 2, wherein the signal input terminal and the signal output terminal are distributed on a same side of the metal strip and spaced away from each other in a longitudinal direction of the metal strip; and the first fastener is fastened to the metal strip, and the first fastener, the signal input terminal and the signal output terminal are located on a same side of the metal strip.

5. The phase shifter according to claim 2, wherein the fastener comprises a second fastener disposed on the same side as the first fastener and spaced away from the first fastener; wherein the second fastener comprises a first part disposed on the first surface of the metal strip and a second part disposed on the second surface of the metal strip, and both ends that are of the first part and the second part of the second fastener and that are far away from the metal strip abut against an inner wall of the cavity.

6. The phase shifter according to claim 5, wherein the second fastener is provided with an opening, which runs through the first part and the second part of the second fastener, a side wall of the cavity is provided with a through hole corresponding to the opening, and a limiting component passes through the through hole and the opening.

7. The phase shifter according to claim 5, wherein the sliding dielectric is flat and disposed on one side of the first surface or the second surface of the metal strip, or a first sliding dielectric is disposed on a first side of the first surface of the metal strip and a second sliding dielectric is disposed on a second side of the second surface of the metal strip.

8. The phase shifter according to claim 7, wherein the first and second sliding dielectrics are fastened and synchronously movable.

9. The phase shifter according to claim 7, wherein each of the sliding dielectric and the metal strip comprises a first section, a second section, and a connection section that connects the first section and the second section, the first section is staggered with the second section in a direction perpendicular to a longitudinal direction of the metal strip; the first section of the sliding dielectric is stacked on the first section of the metal strip and movable relative to the first section of the sliding dielectric, and the second section of the sliding dielectric is stacked on the second section of the metal strip and movable relative to the second section of the sliding dielectric; and the fastener comprises two or more second fasteners in the direction perpendicular to the longitudinal direction of the metal strip, one of the second fasteners and the first section of the sliding dielectric are located on a same side of the second section of the sliding dielectric and disposed in a sliding direction of the first section of the sliding dielectric.

10. The phase shifter according to claim 9, wherein in the direction perpendicular to the longitudinal direction of the metal strip, another second fastener and the second section of the sliding dielectric are located on a same side of the first section of the sliding dielectric and disposed in a sliding direction of the second section of the sliding dielectric.

11. The phase shifter according to claim 7, wherein a conduit is provided on the sliding dielectric, the second fastener is inserted into the conduit and movable along the conduit, and a longitudinal direction of the conduit is the same as that of the metal strip.

12. The phase shifter according to claim 1, wherein the transmission portion is provided with a wavy structure formed by a bent metal wire.

13. A remote electrical tilt antenna, comprising:
- a radiating element; and
- a phase shifter coupled to the radiating element to transmit an electromagnetic wave signal to be radiated by the radiating element, wherein the phase shifter comprises:
  - a cavity,
  - a signal input terminal,
  - a signal output terminal,
  - a metal strip connected to the signal input terminal and the signal output terminal, wherein the metal strip comprises a transmission portion and a fastening portion connected to the transmission portion;
  - a fastener connected to the fastening portion to fasten the metal strip in the cavity, wherein the transmission portion is suspended in the cavity from the fastener being connected to the fastening portion; and
  - a sliding dielectric disposed in the cavity and movable relative to the transmission portion of the metal strip.

14. The remote electrical tilt antenna according to claim 13, wherein the fastener comprises a first fastener, the metal strip comprises a first surface and a second surface opposite to the first surface, and the first fastener comprises a first part disposed on the first surface and a second part disposed on the second surface; and both ends that are of the first part and the second part and that are far away from the metal strip abut against an inner wall of the cavity.

15. The remote electrical tilt antenna according to claim 14, wherein the cavity comprises a first inner wall and a second inner wall that are opposite to each other, the first inner wall faces toward the first surface of the metal strip, and the second inner wall faces toward the second surface of the metal strip, a first groove is disposed on the first inner wall, an end that is of the first part of the first fastener and that is far away from the metal strip is accommodated in the first groove, and/or a second groove is disposed on the second inner wall, and an end that is of the second part of the first fastener and that is far away from the metal strip is accommodated in the second groove.

16. The remote electrical tilt antenna according to claim 14, wherein the signal input terminal and the signal output terminal are distributed on a same side of the metal strip and spaced away from each other in a longitudinal direction of the metal strip; and the first fastener is fastened to the metal strip, and the first fastener, the signal input terminal and the signal output terminal are located on a same side of the metal strip.

17. The remote electrical tilt antenna according to claim 14, wherein the fastener comprises a second fastener disposed on the same side as the first fastener and spaced away from the first fastener; wherein the second fastener comprises a first part disposed on the first surface of the metal strip and a second part disposed on the second surface of the metal strip, and both ends that are of the first part and the second part of the second fastener and that are far away from the metal strip abut against an inner wall of the cavity.

18. The remote electrical tilt antenna according to claim 17, wherein the second fastener is provided with an opening, which runs through the first part and the second part of the second fastener, a side wall of the cavity is provided with a through hole corresponding to the opening, and a limiting component passes through the through hole and the opening.

19. The remote electrical tilt antenna according to claim 17, wherein the sliding dielectric is flat, and the sliding dielectric is located on one side of the first surface or the second surface of the metal strip, or a first sliding dielectric is located on a first side of the first surface of the metal strip and a second sliding dielectric is located on a second side of the second surface of the metal strip.

20. The remote electrical tilt antenna according to claim 19, wherein the first and second sliding dielectrics are fastened and synchronously movable.

* * * * *